(12) United States Patent
Chen

(10) Patent No.: US 10,506,150 B2
(45) Date of Patent: Dec. 10, 2019

(54) TARGET TRACKING DEVICE AND TARGET TRACKING METHOD

(71) Applicant: YUTOU TECHNOLOGY (HANGZHOU) CO., LTD., Xixi Art Village, Wuchang Sub-District, Yuhang District Hangzhou, Zhejiang (CN)

(72) Inventor: Mingxiu Chen, Zhejiang (CN)

(73) Assignee: YUTOU TECHNOLOGY (HANGZHOU) CO., LTD., Zhejiang (CN)

(*) Notice: Subject to any disclaimer, the term of this patent is extended or adjusted under 35 U.S.C. 154(b) by 51 days.

(21) Appl. No.: 15/739,297

(22) PCT Filed: Jun. 13, 2016

(86) PCT No.: PCT/CN2016/085626
§ 371 (c)(1),
(2) Date: Dec. 22, 2017

(87) PCT Pub. No.: WO2017/000765
PCT Pub. Date: Jan. 5, 2017

(65) Prior Publication Data
US 2018/0191950 A1  Jul. 5, 2018

(30) Foreign Application Priority Data

Jun. 30, 2015  (CN) .......................... 2015 1 0387049

(51) Int. Cl.
*G06K 9/00* (2006.01)
*H04N 5/232* (2006.01)
*G06T 7/246* (2017.01)

(52) U.S. Cl.
CPC ......... *H04N 5/23216* (2013.01); *G06T 7/251* (2017.01)

(58) Field of Classification Search
CPC . G06T 2207/10016; G06T 2207/30232; G06T 7/251; G06T 7/254; H04N 5/23216
See application file for complete search history.

(56) References Cited

U.S. PATENT DOCUMENTS 8,923,609 B2 * 12/2014 Eaton ................ G06K 9/00335
382/159
9,158,974 B1 * 10/2015 Laska ..................... G06T 7/246
(Continued)

FOREIGN PATENT DOCUMENTS

| CN | 1402551 | 3/2003 |
| CN | 1937766 | 3/2007 |

(Continued)

OTHER PUBLICATIONS

PCT/CN2016/985626, ISR and Written Opinion, dated Sep. 22, 2016, 7 pages—English, 6 pages—Chinese.

Primary Examiner — Bhavesh M Mehta
Assistant Examiner — Ian L Lemieux
(74) Attorney, Agent, or Firm — Andrew F. Young, Esq.; Lackenbach Siegel, LLP

(57) ABSTRACT

The present invention relates to the technical field of electronic devices, and in particular to a target tracking device and a target tracking method. A moving target tracking device which comprises a target tracking module, a motion module and a comprehensive analysis module is constructed; images of moving targets are acquired from a camera to determine the moving targets and finally determine an effective moving target; parameter information about the current motion of the effective moving target is then calculated, and whether the camera needs to be rotated is judged according to the parameter information; and after the rotation of the camera is completed, the parameter information stored in a memory is updated. By means of the technical solution, a moving target can be accurately and (Continued)

effectively tracked in real time, moreover, the moving target can continue to be tracked after the rotation of the camera is completed, and motion detection and tracking information accumulation do not need to be executed once again as in a traditional method. Furthermore, the technical solution can rapidly track any moving object without depending on any object model.

2 Claims, 5 Drawing Sheets

(56) References Cited

U.S. PATENT DOCUMENTS

| | | | | |
|---|---|---|---|---|
| 2009/0262197 | A1* | 10/2009 | Nakamura | G01S 3/7864 |
| | | | | 348/169 |
| 2011/0081043 | A1* | 4/2011 | Sabol | G06T 7/254 |
| | | | | 382/103 |
| 2012/0134541 | A1* | 5/2012 | Hara | G06K 9/00261 |
| | | | | 382/103 |
| 2018/0095533 | A1* | 4/2018 | Song | H04N 5/23238 |
| 2019/0147279 | A1* | 5/2019 | Liu | G06K 9/00993 |
| | | | | 382/181 |

FOREIGN PATENT DOCUMENTS

| | | |
|---|---|---|
| CN | 101572804 | 11/2009 |
| CN | 102307297 | 1/2012 |
| CN | 103237195 | 8/2013 |

\* cited by examiner

TARGET TRACKING DEVICE AND TARGET TRACKING METHOD

CROSS-REFERENCE TO RELATED APPLICATIONS

The present application claims priority to and the benefit of PCT/CN2016/085626 filed Jun. 13, 2016, the entire contents of which are incorporated herein by reference which in turn claims priority to Chinese Patent Application No. CN 201510387049.1, filed on Jun. 30, 2015

BACKGROUND OF THE INVENTION

1. Field of the Invention

The present invention relates to the technical field of electronic equipment, and in particular, to a target tracking apparatus and a tracking method.

2. Description of the Related Art

At present, the target tracking function has been implemented in image processing. The target tracking mainly includes two aspects: First, based on a fixed static camera, the content acquired by the camera is analyzed to achieve the target tracking in the static background. Second, based on a certain type of object detection model, the target detection is completed and the detection results are tracked.

The fixed camera-based tracking algorithm uses the frame difference method. The latter is a variant method similar to the frame difference method. These algorithms easily lose the tracking target when the camera changes direction or position.

However, the tracking algorithm based on the target detection model needs to train the model of the object well in advance. The algorithm can detect the effect of the objects that has been trained well, but if it is extended to many kinds of objects, it needs to train a plurality of different Model, in this case will have a greater workload, and the target tracking device has higher computational performance requirements.

Therefore, how to better solve the problem of tracking multiple types of objects in the dynamic background of non-static cameras has become a major challenge to those skilled in the art.

SUMMARY OF THE INVENTION

In order to solve the above problems, the present invention provides a target tracking device and a target tracking method. By constructing a target tracking device including a target tracking module, a motion module and a comprehensive analysis module, the tracking algorithm is compensated by the motion parameters of the moving target in the camera to achieve a variety of issues in the non-static background of the target tracking, the technical programs are as follows:

A target tracking device, wherein, comprising the device applied to tracking a target by a camera. The said device comprises:

a target tracking module, for acquiring an image collected by a camera and determining the moving target according to the collected image to finally determine an effective moving target;

a movement module, which is connected with the target tracking module and configured to calculate parameter information of the current movement of the valid moving target and determine whether the camera needs to be rotated according to the parameter information;

a comprehensive analysis module, which is connected with the movement module and the target tracking module, refreshing the parameter information after the camera rotates, notifying the target tracking module to continue tracking the target.

In the above target tracking apparatus, the target tracking module comprises:

a moving object image acquisition module, a moving object image acquisition module for acquiring the current frame in the image acquired by the camera and the first two frames of images relative to the current frame;

the first storage module, storing images acquired by the moving-subject image obtaining module;

an effective movement target determination module, determining an effective movement target based on the image stored in the memory module.

The movement module specifically comprises:

a calculating module, which is configured to calculate parameter information of the current movement of the valid moving target;

the second storage module, which is connected with the calculation module, for storing the parameter information;

the determination module, which is connected with the storage module to determine whether the camera needs to be rotated according to the parameter information stored in the storage module.

In the above target tracking apparatus, the movement module specifically comprises, a calculating module, which is configured to calculate parameter information of the current movement of the valid moving target;

the second storage module, which is connected with the calculation module, for storing the parameter information;

the determination module, which is connected with the storage module to determine whether the camera needs to be rotated according to the parameter information stored in the storage module.

In the above target tracking apparatus, the parameter information comprises duration of movement, a movement displacement, and a movement azimuth of the said effective moving target.

A target tracking method based on the above object tracking apparatus, wherein the method comprises: acquiring a moving image of a moving target, determining the moving target according to the moving image, and finally determining an effective moving target;

calculating parameter information of the current movement of the effective moving target, and determining whether the camera needs to be rotated according to the parameter information;

if there is no need to rotate the camera, then continue to wait for the next parameter information; if it's necessary to rotate the camera, turn the camera and refresh the parameter information stored in the storage module.

In the above target tracking method, the step of acquiring a moving image of a moving target, determining the moving target according to the moving image, and finally determining an effective moving target specifically comprises:

acquiring image information collected from a camera in a first frame, a second frame, and a third frame to obtain a movement picture of the moving target;

the points in the movement picture that are not equal to 0, represented as a movement element, finding all connected movement elements and determining the suspected movement target;

calculating the exercise intensity of the suspected exercise target, discarding the exercise unit whose exercise intensity is less than a threshold, and determining the effective exercise target.

In the above object tracking method, the method for determining whether the camera needs to be rotated according to the parameter information specifically comprises:

respectively setting the continuous movement time threshold, the movement displacement threshold and the movement azimuth threshold of the effective moving target and storing them in a storage module;

calculating a continuous movement time, a movement displacement and a movement azimuth of an effective moving target and placing the same in the storage module;

analyzing and judging whether the camera is rotated and refreshing the parameters stored in the memory module when the duration of the movement reaches the movement duration threshold and the movement displacement reaches the movement displacement threshold and the movement azimuth reaches the movement azimuth threshold of the movement; otherwise, proceeding to determine the next set of parametric information for the valid moving target.

The invention has the advantages as well as the beneficial effects that can be achieved:

By adopting the technical scheme of the invention, the moving target can be accurately and real-time tracked and continuously resumed as soon as possible after the rotating of the camera, there is no need to re-accumulate the movement detection and tracking information by the traditional method, and the object of any movement can be rapidly tracked without the model of the object.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
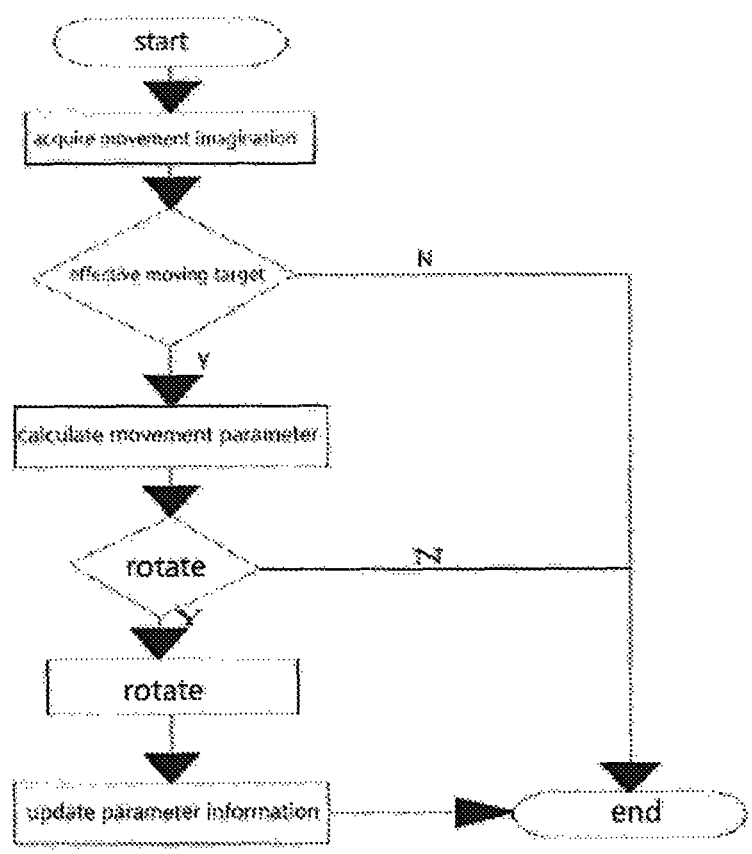
FIG. 1 is a flow chart of a moving target tracking algorithm in an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The present invention introduces a target tracking device, wherein the device is applied to tracking a moving target by a camera, and the device mainly comprises a target tracking module, a motion module and a comprehensive analysis module, wherein:

a target tracking module, for acquiring an image collected by a camera and determining the moving target according to the collected image to finally determine an effective moving target;

a movement module, which is connected with the target tracking module and configured to calculate parameter information of the current movement of the valid moving target and determine whether the camera needs to be rotated according to the parameter information;

a comprehensive analysis module, which is connected with the movement module and the target tracking module, refreshing the parameter information after the camera rotates, notifying the target tracking module to continue tracking the target.

As a preferred embodiment of the present invention, the target tracking module comprises:

a moving object image acquisition module for acquiring the current frame in the image acquired by the camera and the first two frames of images relative to the current frame;

the first storage module, storing images acquired by the moving-subject image obtaining module;

an effective movement target determination module, determining an effective movement target based on the image stored in the memory module.

As a preferred embodiment of the present invention, the movement module specifically comprises a calculating module, a second storage module, and a determination module, wherein:

a calculating module, which is configured to calculate parameter information of the current movement of the valid moving target;

the second storage module, which is connected with the calculation module, for storing the parameter information;

the determination module, which is connected with the storage module to determine whether the camera needs to be rotated according to the parameter information stored in the storage module.

On this basis, further, the parameter information comprises duration of movement, a movement displacement, and a movement azimuth of the said effective moving target.

Figure 2:
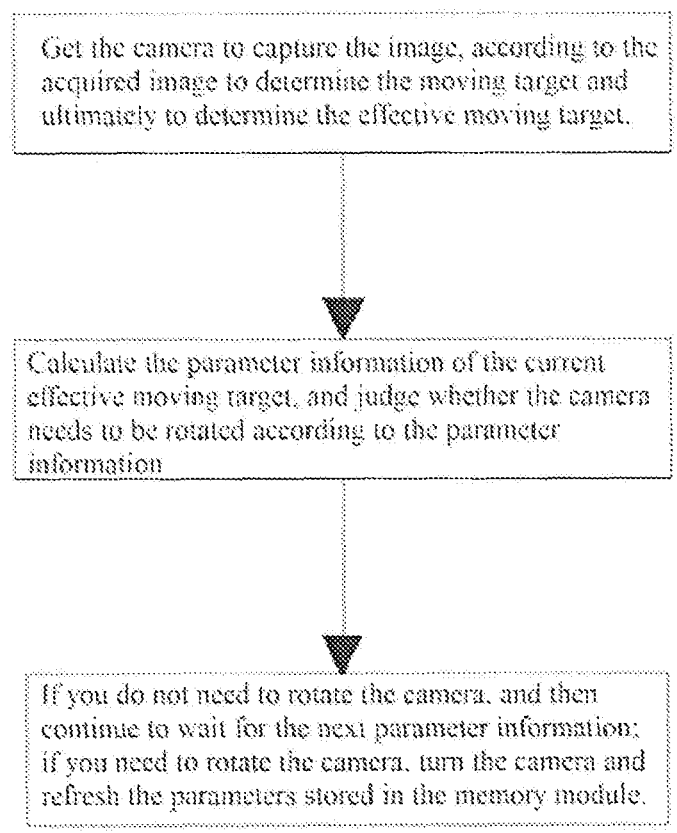
FIG. 2 is a schematic structural diagram of a method for tracking a moving target according to an embodiment of the present invention.

As shown in FIG. 1, firstly, obtain an image, determine the moving object, continuously determine the effective moving object, and then calculate the parameter information of the moving object. When the parameter information reaches a set threshold, rotate the camera and refresh the parameter information and the location information of the camera stored in the memory. The specific method is as follows:

As shown in the structural schematic diagram of FIG. 2, the specific method comprises:

Getting the camera to capture the image, according to the acquired image to determine the moving target and ultimately to determine the effective moving target.

Calculating the parameter information of the current effective moving target, and judging whether the camera needs to be rotated according to the parameter information;

If you do not need to rotate the camera, and then continue to wait for the next parameter information; if you need to rotate the camera, turn the camera and refresh the parameters stored in the memory module. In addition, the position information of the camera is stored in the memory. The position information of the camera stored in the memory is updated once every time the camera rotates, and the position information of the camera after the last rotation is used as a reference.

Figure 3:
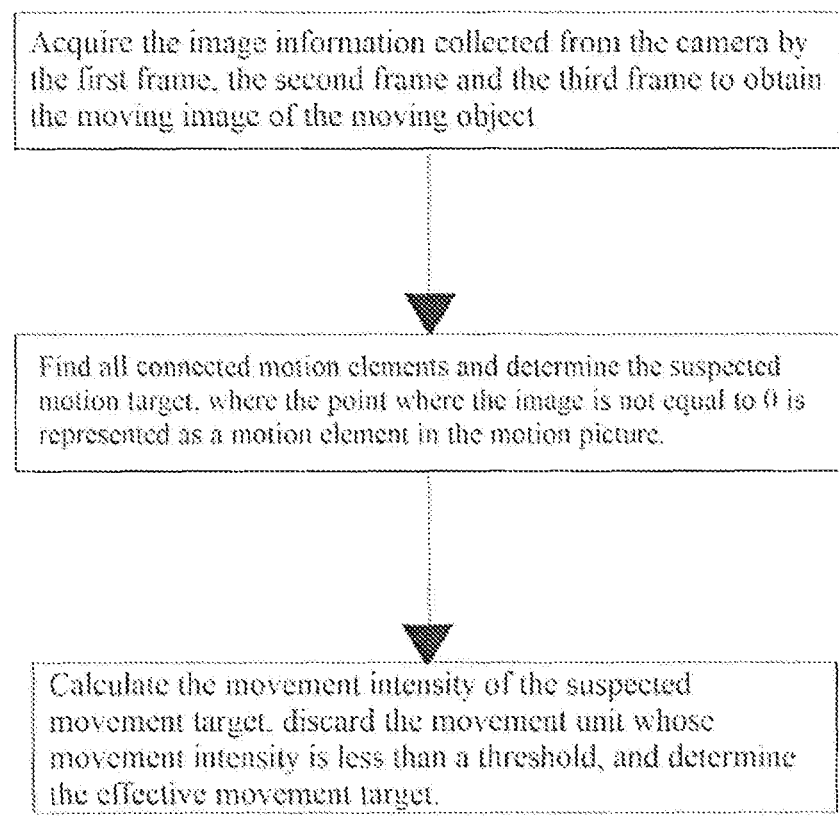
FIG. 3 is a schematic structural view of a method for determining an effective moving object according to an embodiment of the present invention.

As shown in the structural schematic diagram of FIG. 3, in a preferred embodiment of the present invention, wherein, the steps of acquiring a moving image of a moving target, determining the moving target according to the moving image, and finally determining an effective moving target specifically comprises:

Acquiring the image information collected from the camera by the first frame, the second frame and the third frame to obtain the moving image of the moving object (the current frame is defined as the third frame, the first two frames are respectively defined as the first frame and the second frame according to time);

Finding all connected motion elements and determining the suspected motion target, where the point where the image is not equal to 0 is represented as a motion element in the motion picture.

Calculating the movement intensity of the suspected movement target, discard the movement unit whose movement intensity is less than a threshold, and determine the effective movement target.

As a specific embodiment of the present invention, first, obtain the image information which the current frame (the third frame), the first frame and the second frame collecting from the camera.

Subtract the third frame from the first frame to obtain a difference image img1, subtract the third frame from the second frame to obtain a difference image img2, and superimpose the img1 and img2 to obtain a moving image.

Then represent the point in the moving image that is not equal to 0 as a moving element and find all connected moving elements which form a suspected moving object.

Finally, calculate the movement intensity of all suspected moving objects, according to the formula: movement intensity=number of movement elements/rectangular area of the suspected target.

The greater the movement intensity value, the more abundant the movement information in this area.

On the contrary, the smaller the movement intensity, the more sparse the movement information in the area, And we define a threshold of movement intensity in advance. When the movement intensity of the suspected exercise target is less than the threshold value, we filter it and give up the moving elements with the movement intensity less than the preset threshold of movement intensity to get the effective moving target.

Figure 4:
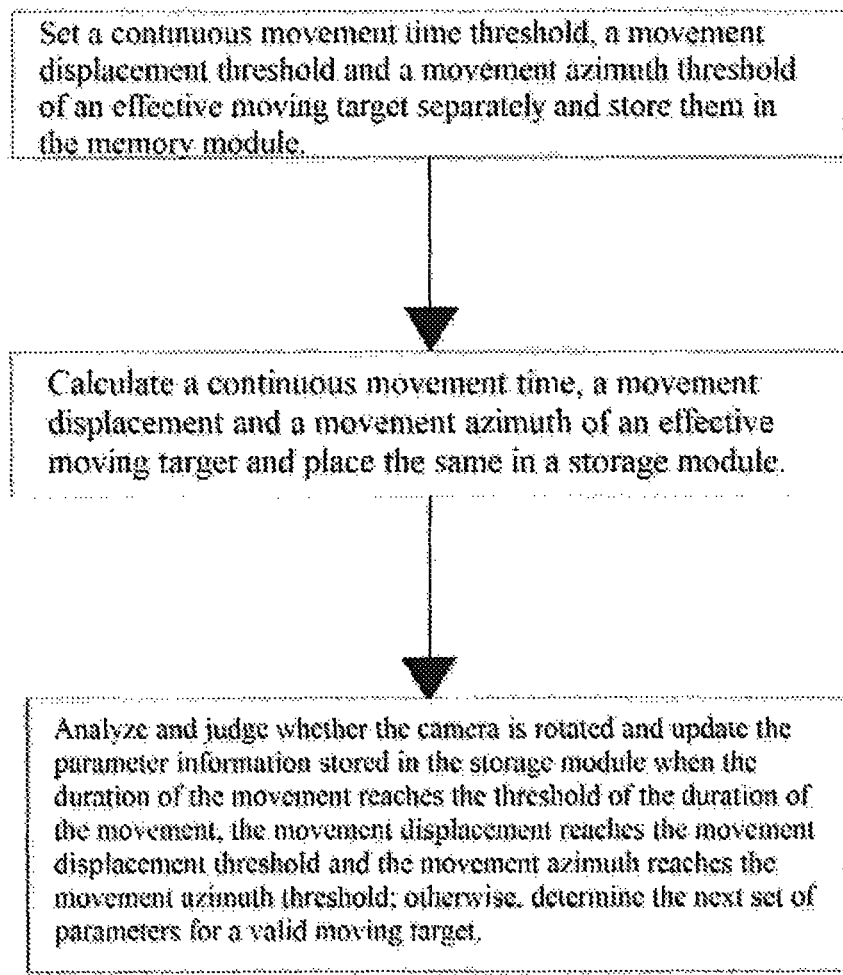
FIG. 4 is a schematic structural diagram of a method for determining whether a camera needs to be rotated according to an embodiment of the present invention.

As shown in the structural schematic diagram of FIG. 4, as a preferred embodiment of the present invention, a method for determining whether the camera needs to be rotated according to the parameter information specifically comprises:

Setting a continuous movement time threshold, a movement displacement threshold and a movement azimuth threshold of an effective moving target separately and storing them in the second memory module;

Calculating a continuous movement time, a movement displacement and a movement azimuth of an effective moving target and placing the same in a second storage module;

Analyzing and judging whether the camera is rotated and updating the parameter information stored in the storage module when the duration of the movement reaches the threshold of the duration of the movement, the movement displacement reaches the movement displacement threshold and the movement azimuth reaches the movement azimuth threshold; otherwise, determine the next set of parameters for a valid moving target.

Figure 5:
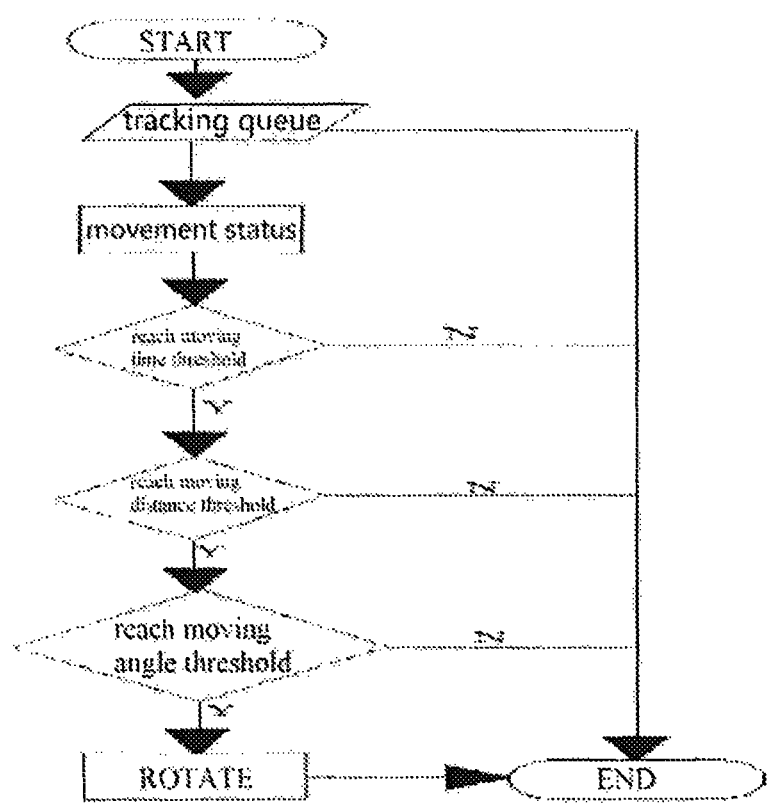
FIG. 5 is a schematic flow chart of an algorithm for determining whether a camera needs to be rotated according to an embodiment of the present invention.

As shown in the flow chart of FIG. 5, when tracking a moving target, it is first determined whether the continuous moving time of the moving target reaches the set continuous moving time threshold. If not reached, then end the moving target track, and start tracking the next target. If the set duration of moving threshold is reached, determine whether the movement displacement of the moving target reaches the set movement displacement threshold. If not reached, the tracking of the moving target ends and start tracking the next moving target. If the set moving displacement threshold is reached, it is determined whether the moving target reaches the set moving angle threshold. If the set movement azimuth threshold is not reached, then end the moving target track, and start tracking the next target. If the set moving angle of azimuth threshold is reached, rotate the camera.

Among them, if there is an extremely fast object flew in front of the camera, although the moving distance is long enough, there is no necessary to track, and setting the duration threshold can effectively prevent the camera from rotation in this situation;

If an object jerks slightly in front of the camera, although the duration is long enough, the movement displacement does not reach the threshold of movement displacement, namely, the threshold of movement displacement can effectively prevent the camera from rotating in this situation.

When the target being tracked is performing a slight wandering movement in front of the camera, it is judged that there is no need to rotate the camera based on the movement azimuth threshold.

After the camera completes a rotation, the parameter information of the tracking target stored in the storage module needs to be updated, and the dynamic information of the camera is also updated in time after a rotation. In this way, the next camera rotation can be prevented from being deviated. The specific performance: If the next target continued to steer toward the direction of the camera, which may make the next camera steering speed too fast, the angle too large. If the next target is moving in the opposite direction of the camera, the latest tracking window may coincide with the tracking window before the camera rotation, or lead to no steering, tracking lag or loss due to such small movement.

In summary, the present invention constructs a moving target tracking device including a target tracking module, a movement module and a comprehensive analysis module by acquiring the images captured by the camera to determine the moving target and finally to determine the effective moving target, and then calculating the parameter information of the current effective moving target and judging whether it is needed to rotate the camera according to the parameter information and updating the parameter information stored in the memory after the camera rotation is completed. Through the technical proposal, the moving target can be accurately and effectively tracked in real time and the moving target can be continuously tracked after the camera finishes rotating instead of re-performing the motion detection and tracking information accumulation like the traditional method. Moreover, the technical solution can quickly track any moving object without relying on any object model.

A person skilled in the art should understand that, those skilled in the art may realize the foregoing variations in combination with the prior art and the foregoing embodiments, and details are not described herein again. Such variations do not affect the essence of the present invention and will not be repeated here.

The foregoing is only a preferred embodiment of the present invention and is not intended to limit the description and the scope of protection of the invention, and it will be appreciated by those skilled in the art that equivalent replacement using the specification and drawings of the present invention, and solution with apparent changes to specification and drawings of the present invention are to be included within the scope of the present invention.

What is claimed is:

1. A target tracking method, applied to tracking of a moving target, said method comprising:

acquiring a moving image of a moving target, determining the moving target according to the moving image, and finally determining an effective moving target;

calculating parameter information of the current movement of the effective moving target, and determining whether the camera needs to be rotated according to the parameter information; and when the parameter information does not reach its threshold, there is no need to rotate the camera, then continue to wait for next parameter information; when the parameter information reaches threshold, it's necessary to rotate the camera, turn the camera and refresh the parameter information stored in a storage module;

the step of acquiring a moving image of a moving target, determining the moving target according to the moving image, and finally determining an effective moving target specifically comprises:

acquiring image information collected from a camera in a first frame, a second frame, and a third frame, subtract the third frame from the first frame to obtain a difference image img1, subtract the third frame from the second frame to obtain a difference image img2, and superimpose the img1 and img2 to obtain moving image of the moving target;

points in the moving image that are not equal to 0, represented as a movement element, finding all connected movement elements and determining a suspected movement target;

calculating exercise intensity of the suspected movement target, the exercise intensity of the suspected movement target=number of movement elements/rectangular area of the suspected movement target, discarding the movement element whose exercise intensity is less than a threshold, and determining the effective moving target.

2. The target tracking method as claimed in claim 1, wherein: the method for determining whether the camera needs to be rotated according to the parameter information specifically further comprises the steps of:

respectively setting a continuous movement time threshold, a movement displacement threshold and a movement azimuth threshold of an effective moving target and storing them in a storage module;

calculating a continuous movement time, a movement displacement and a movement azimuth of an effective moving target and placing the same in the storage module;

analyzing and judging whether the camera is rotated and refreshing the parameter information of the tracking target stored in the storage module when the continuous movement time reaches the continuous movement time threshold and the movement displacement reaches the movement displacement threshold and the movement azimuth reaches the movement azimuth threshold of the movement; otherwise, proceeding to determine the next set of parameter information for the effective moving target.

* * * * *